(12) United States Patent
Wu et al.

(10) Patent No.: US 10,072,499 B2
(45) Date of Patent: Sep. 11, 2018

(54) SIGNAL PROCESSING METHODS FOR STEERING TO AN UNDERGROUND TARGET

(71) Applicant: Halliburton Energy Services, Inc., Houston, TX (US)

(72) Inventors: Hsu-Hsiang Wu, Sugar Land, TX (US); Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/635,742

(22) Filed: Jun. 28, 2017

(65) Prior Publication Data

US 2017/0298725 A1 Oct. 19, 2017

Related U.S. Application Data

(60) Division of application No. 13/855,408, filed on Apr. 2, 2013, now Pat. No. 9,759,831, which is a
(Continued)

(51) Int. Cl.
*G01V 3/08* (2006.01)
*E21B 49/00* (2006.01)
(Continued)

(52) U.S. Cl.
CPC .............. *E21B 49/00* (2013.01); *E21B 7/04* (2013.01); *E21B 47/0002* (2013.01);
(Continued)

(58) Field of Classification Search
USPC .............................. 702/6, 7, 9; 324/338, 339
See application file for complete search history.

(56) References Cited

U.S. PATENT DOCUMENTS

| 5,329,448 A | 7/1994 | Rosthal |
| 7,392,137 B2 * | 6/2008 | Tabarovsky ............. G01V 3/28 324/335 |

(Continued)

FOREIGN PATENT DOCUMENTS

| WO | 2008076130 A1 | 6/2008 |
| WO | 2008115229 A1 | 9/2008 |

OTHER PUBLICATIONS

International Search Report and Written Opinion, International Application No. PCT/US2011/027353, 16 pgs, dated Apr. 11, 2012.
(Continued)

*Primary Examiner* — Lam Nguyen
(74) *Attorney, Agent, or Firm* — John Wustenberg; Baker Botts L.L.P.

(57) ABSTRACT

A method of processing data from an electromagnetic resistivity logging tool which includes a transmitter coil and a receiver coil is disclosed. The electromagnetic resistivity logging tool is placed at a desired location. The transmitter coil and the receiver coil are positioned at a first azimuthal angle. A signal is transmitted from the receiver coil. The receiver coil then receives a signal. The signal at the receiver coil, a tilt angle of the transmitter coil, a tilt angle of the receiver coil and the first azimuthal angle are then used to calculate a first complex voltage representing at least one component of the received signal.

11 Claims, 13 Drawing Sheets

Related U.S. Application Data continuation of application No. PCT/US2011/027353, filed on Mar. 7, 2011.

(51) Int. Cl.
G01V 3/38 (2006.01)
G01V 3/30 (2006.01)
E21B 7/04 (2006.01)
E21B 47/024 (2006.01)
E21B 47/09 (2012.01)
E21B 47/022 (2012.01)
E21B 47/00 (2012.01)
E21B 47/12 (2012.01)

(52) U.S. Cl.
CPC ...... *E21B 47/024* (2013.01); *E21B 47/02216* (2013.01); *E21B 47/0905* (2013.01); *G01V 3/30* (2013.01); *G01V 3/38* (2013.01); *E21B 47/122* (2013.01)

(56) References Cited

U.S. PATENT DOCUMENTS

| 8,274,289 B2 * | 9/2012 | Bittar | E21B 47/024 324/338 |
| 8,581,592 B2 * | 11/2013 | Bittar | E21B 47/01 324/338 |
| 2010/0156424 A1 * | 6/2010 | Bittar | G01V 3/28 324/339 |

OTHER PUBLICATIONS

International Preliminary Report on Patentability, International Application No. PCT/US2011/027353, dated Sep. 19, 2013, 11 pages.

\* cited by examiner

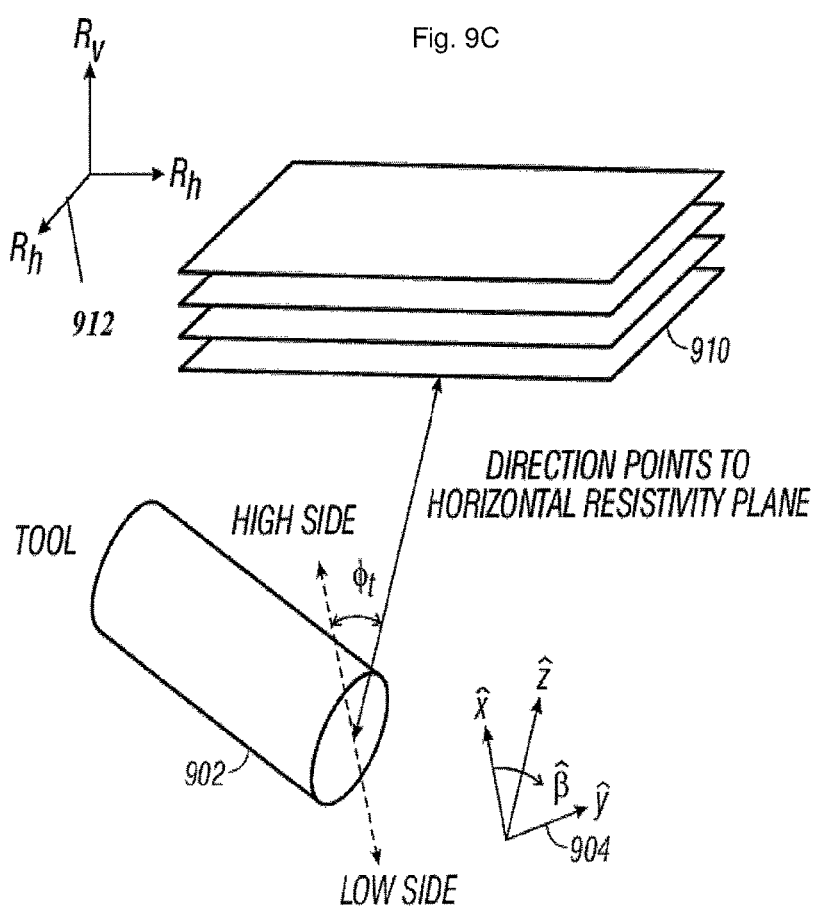

SIGNAL PROCESSING METHODS FOR STEERING TO AN UNDERGROUND TARGET

CROSS-REFERENCE TO RELATED APPLICATIONS

This application claims priority to and is a divisional of U.S. patent application Ser. No. 13/855,408, filed on Apr. 2, 2013, and entitled "Signal Processing Methods for Steering to an Underground Target," which is a continuation of International Application No. PCT/US2011/027353, filed Mar. 7, 2011, the entire disclosures of which are incorporated herein by reference.

BACKGROUND

The basic techniques for electromagnetic logging for earth formations are well known. For instance, induction logging to determine resistivity (or its inverse, conductivity) of earth formations adjacent a borehole has long been a standard and important technique in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

The resistivity of a given formation may be isotropic (equal in all directions) or anisotropic (unequal in different directions). In electrically anisotropic formations, the anisotropy is generally attributable to extremely fine layering during the sedimentary build-up of the formation. As a result, in a formation Cartesian coordinate system oriented such that the x-y plane is parallel to the formation layers and the z axis is perpendicular to the formation layers, resistivities Rx and Ry in the x and y directions, respectively, tend to be similar, but resistivity Rz in the z direction tends to be different. The resistivity in a direction parallel to the formation plane (i.e., the x-y plane) is known as the horizontal resistivity, Rh, and the resistivity in the direction perpendicular to the plane of the formation (i.e., the z direction) is known as the vertical resistivity, Rv. The index of anisotropy, $\eta$, is defined as $\eta=[Rv/Rh]^{1/2}$.

As a further complication to measuring formation resistivity, boreholes are generally perpendicular to formation beds. The angle between the axis of the well bore and the orientation of the formation beds (as represented by the normal vector) has two components. These components are the dip angle and the strike angle. The dip angle is the angle between the borehole axis and the normal vector for the formation bed. The strike angle is the direction in which the borehole's axis "leans away from" the normal vector.

Electromagnetic resistivity logging measurements are a complex function of formation resistivity, formation anisotropy, and the formation dip and strike angles, which may all be unknown. Logging tools that fail to account for one or more of these parameters may produce inaccurate measurements. Moreover, tools that are able to provide dip and strike measurements along with azimuthal orientation information can be used to adjust the drilling direction to increase the borehole's exposure to a hydrocarbon bearing formation ("geosteering"). Specifically, it is desirable to be able to steer a tool to an underground target using the information available from the logging tool. Moreover, it is desirable to be able to match raw measurements to the modeled response for the system to evaluate the system performance.

BRIEF DESCRIPTION OF THE DRAWINGS

FIGS. 9a, 9b, and 9c show an illustrative configuration of a rotating tool's relationship to surrounding environments.

DETAILED DESCRIPTION

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

The present application discloses processing schemes for a rotating electromagnetic tool equipped with tilt antenna systems having arbitrary tilted angles for transmitters and receivers. Accordingly, the methods disclosed herein provide a novel approach to steering an underground target surrounding the electromagnetic tool. A relative azimuthal angle sensitivity of the tool is introduced and various mathematical relations of tool signal responses are discussed upon a defined relative azimuthal angle between the tool and the surrounding target. By finding the relative azimuthal angle, one can steer the tool to its surrounding target as well as match raw measurements to the forwarding model responses.

Figure 1:
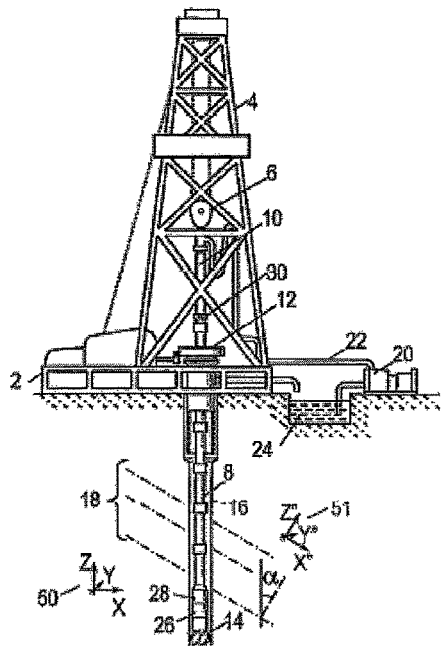
FIG. 1 shows an illustrative logging while drilling environment including dipping formation beds.

Turning now to FIG. 1, an illustrative logging while drilling ("LWD") environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An electromagnetic resistivity logging tool 26 may be integrated into the bottom-hole assembly near the bit 14. As the bit extends the borehole through the formations, logging tool 26 collects measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments, the tool includes a 3-axis fluxgate magnetometer and a 3-axis accelerometer. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

In one embodiment, rotational position indicator array may contain both a 3-axis fluxgate magnetometer and a 3-axis accelerometer. As would be appreciated by those of ordinary skill in the art, with the benefit of this disclosure, the combination of those two sensor systems enables the measurement of the tool face, inclination, and azimuth orientation angles of the borehole. The tool face and hole inclination angles are calculated from the accelerometer sensor output. The magnetometer sensor outputs are used to calculate the hole azimuth. With the tool face, the hole inclination, and the hole azimuth information, a tool in accordance with the present invention can be used to steer the bit to the desirable bed. Specifically, the response difference or the response ratio can be used effectively to enter a desired payzone or to stay within the payzone of interest.

Figure 2:
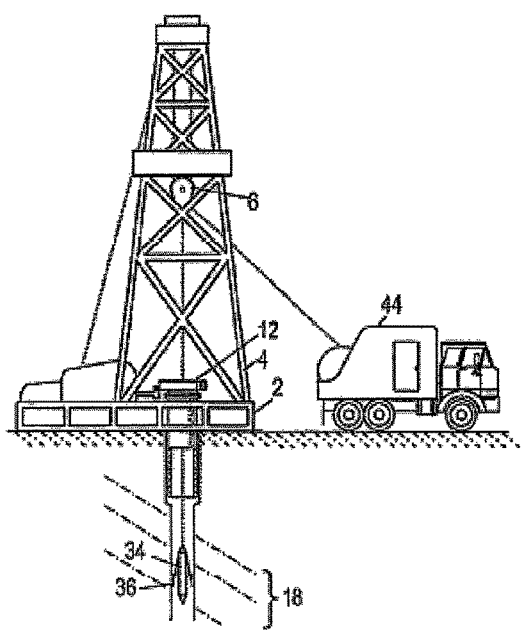
FIG. 2 shows an illustrative wireline logging environment including dipping formation beds.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable having conductors for transporting power to the tool and telemetry from the tool to the surface. A resistivity imaging portion of the logging tool 34 may have centralizing arms 36 that center the tool within the borehole as the tool is pulled uphole. A logging facility 44 may collect measurements from the logging tool 34, and may include computing facilities for processing and storing the measurements gathered by the logging tool.

Figure 3:
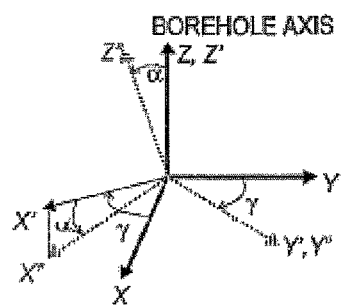
FIG. 3 shows a relationship between the orientation of a borehole and a dipping formation bed.

Returning now to FIG. 1, it shows that the formations 18 are not perpendicular to the borehole, which may occur naturally or due to directional drilling operations. The borehole may have a Cartesian coordinate system 50 defined in accordance with the borehole's long axis (the z-axis) and the north side (or alternatively, the high side) of the hole (the x-axis). The formations 18, when characterized as a plane, may have a Cartesian coordinate system 51 defined in accordance with the normal to the plane (the z"-axis) and the direction of steepest descent (the x"-axis). As shown in FIG. 3, the two Cartesian coordinate systems are related by two rotations. Beginning with the borehole's Cartesian coordinate system (x,y,z), a first rotation of angle γ is made about the z-axis. The resulting Cartesian coordinate system is denoted (x',y',z'). Angle γ is the relative strike angle, which indicates the direction of the formation dip relative to the borehole's Cartesian coordinate system. A second rotation of angle α is then made about the y' axis. This aligns the borehole Cartesian coordinate system with the formation Cartesian coordinate system. Angle α is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable.

Figure 4:
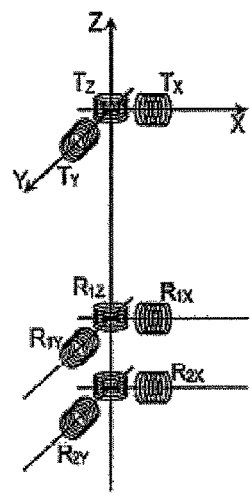
FIG. 4 shows a hypothetical antenna arrangement for a tool having an orthogonal triaxial transmitter and two orthogonal triaxial receivers.

FIG. 4 shows a hypothetical antenna configuration for a multi-component electromagnetic resistivity logging tool which may be embodied as a wireline tool as well as a logging while drilling tool. A triad of transmitter coils $T_X$, $T_Y$, and $T_Z$, each oriented along a respective axis, may be provided. At least one triad of similarly oriented receiver coils $R_{1X}$, $R_{1Y}$, and $R_{1Z}$ may also be provided. For received signal measurements relative to the amplitude and phase of the transmitted signal (sometimes called "absolute" measurements) only one receiver triad would be used. A second triad of similarly oriented receiver coils pairs $R_{2X}$, $R_{2Y}$, and $R_{2Z}$ may also be provided when differential measurements are desired (e.g., a signal amplitude ratio or a phase difference between receiver coils oriented along a given axis). Differential measurements may offer increased spatial resolution.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \qquad (1)$$

In express form, equation (1) is:

$$\begin{bmatrix} Hx \\ Hy \\ Hz \end{bmatrix} = \begin{bmatrix} Cxx & Cxy & Cxz \\ Cyx & Cyy & Cyz \\ Czx & Czy & Czz \end{bmatrix} \begin{bmatrix} Mx \\ My \\ Mz \end{bmatrix} \qquad (2)$$

where Mx, My, and Mz are the magnetic moments (proportional to transmit signal strength) created by transmitters Tx, Ty, and Tz, respectively. Hx, Hy, Hz are the magnetic fields (proportional to received signal strength) at the receiver antennas Rx, Ry, and Rz, respectively.

In the antenna configuration of FIG. 4, if each transmitter is fired in turn, and signal measurements are made at each receiver in response to each firing, nine absolute or differential measurements are obtained. These nine measurements enable the determination of a complete coupling matrix C. ($C_{IJ}=a_{IJ}v_I^J$, where I is the index for receiver Rx, Ry, or Rz, J is the index for transmitter Tx, Ty, or Tz, $a_{IJ}$ is a constant determined by the tool design, and $v_I^J$ is a complex value representing the signal amplitude and phase shift measured by receiver I in response to the firing of transmitter J.). Knowledge of the complete coupling matrix enables the determination of dip angle, strike angle, vertical resistivity, and horizontal resistivity. A number of techniques may be used to determine these parameters. For example, dip and strike angle may be determined from coupling matrix values as explained by Li Gao and Stanley Gianzero, U.S. Pat. No. 6,727,706, "Virtual Steering of Induction Tool for Determination of Formation Dip Angle." Given these angles, vertical and horizontal resistivity can be determined in accordance with equations provided by Michael Bittar, U.S. Pat. No. 7,019,528 "Electromagnetic Wave Resistivity Tool Having a Tilted Antenna for Geosteering Within a Desired Payzone." Alternatively, a simultaneous solution for these parameters may be found as described in the Bittar reference.

Figure 5:
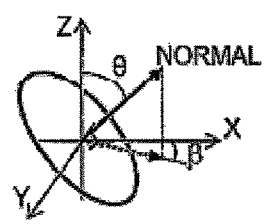
FIG. 5 shows angles for defining the orientation of a tilted antenna.

FIG. 5 shows two angles that may be used to specify the orientation of a coil antenna. The coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the x-axis of the borehole Cartesian coordinate system. As would be appreciated by those of ordinary skill in the art, with the benefit of this disclosure, the methods and systems disclosed herein are not limited to any particular azimuthal angle. Specifically, the transmitter and receiver coils may have any azimuthal angle suitable for a particular application. Moreover, although the present application discloses an embodiment with a transmitter coil having the same azimuthal angle as a receiver coil, as would be appreciated by those of ordinary skill in the art, with the benefit of this disclosure, the methods and systems disclosed herein may also be applied in instances where the transmitter coil(s) and the receiver coil(s) have differing azimuthal angles. For instance, in one exemplary embodiment, one or both of the transmitter coil(s) and the receiver coil(s) may be positioned in a window inside the tool facing outwards rather than being wrapped around the tool 902. Further, in one embodiment, the normal vector of the coil antenna may be co-planar with the X-Y plane.

It is noted that three transmitter antenna orientations and three receiver antenna orientations are employed in the antenna configuration of FIG. 4. It has been discovered that when tool rotation is exploited, it is possible to determine the full coupling matrix with only one transmitter and two receiver antenna orientations (or equivalently, one receiver and two transmitter antenna orientations). Moreover, with certain assumptions about the configuration of the formation, one transmitter and receiver antenna orientation may be sufficient.

Figure 6:
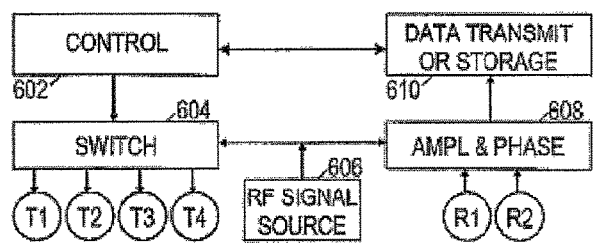
FIG. 6 shows a block diagram of an exemplary electronics module for an electromagnetic resistivity tool.

Before considering various tools having specific antenna configurations, the electronics common to each tool are described. FIG. 6 shows a functional block diagram of the electronics for a resistivity tool. The electronics include a control module 602 that is coupled to an analog switch 604. Analog switch 604 is configured to drive any one of the transmitter coils $T_1$, $T_2$, $T_3$, $T_4$ with an alternating current (AC) signal from a signal source 606. In some embodiments, the signal source provides radio frequency signals. The control module 602 preferably selects a transmitter coil, pauses long enough for transients to die out, then signals data storage/transmit module 610 to accept an amplitude and phase sample of the signals received by each of the receivers. The control module 602 preferably repeats this process sequentially for each of the transmitters. The amplitude and phase shift values are provided by amplitude and phase shift detector 608 which is coupled to each of the receiver coils $R_1$ and $R_2$ for this purpose.

Control module 602 may process the amplitude and phase shift measurements to obtain compensated measurements and/or measurement averages. The raw, compensated, or averaged measurements, may be transmitted to the surface for processing to determine dip and strike angles, vertical and horizontal resistivity, and other information such as (i) distance to nearest bed boundary, (ii) direction of nearest bed boundary, and (iii) resistivity of any nearby adjacent beds. The data storage/transmitter module 610 may be coupled to telemetry unit 28 (FIG. 1) to transmit signal measurements to the surface. Telemetry unit 28 can use any of several known techniques for transmitting information to the surface, including but not limited to, (1) mud pressure pulse; (2) hard-wire connection; (3) acoustic waves; and (4) electromagnetic waves.

Figure 7:
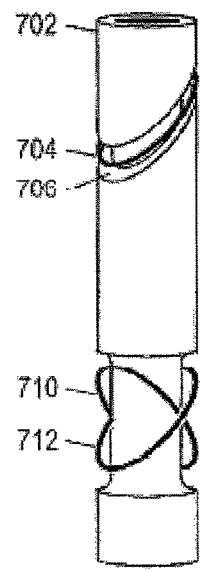
FIG. 7 shows an illustrative electromagnetic resistivity logging tool having tilted transmitter and receiver antennas.

FIG. 7 shows an electromagnetic resistivity logging tool 702 having only two receiver antenna orientations. The tool 702 is provided with one or more regions 706 of reduced diameter. A wire coil 704 is placed in the region 706 and in some embodiments is spaced away from the surface of subassembly 702 by a constant distance. To mechanically support and protect the coil 704, a non-conductive filler material (not shown) such as epoxy, rubber, or ceramic may be used in the reduced diameter regions 706. Coil 704 is a transmitter coil, and coils 710 and 712 are receiving coils. In operation, transmitter coil 704 transmits an interrogating electromagnetic signal which propagates through the borehole and surrounding formation. Receiver coils 710, 712 detect the interrogating electromagnetic signal and provide a measure of the electromagnetic signal's amplitude attenuation and phase shift. For differential measurements, additional receiver coils parallel to coils 710, 712 may be provided at an axially spaced distance. From the absolute or differential amplitude attenuation and phase shift measurements, the coupling matrix components can be determined and used as the basis for determining formation parameters and as the basis for geosteering.

In one embodiment, the transmitter coil 704 may be spaced approximately 30 inches from the receiver coils 710, 712. The transmitter and receiver coils may comprise as little as one loop of wire, although more loops may provide additional signal power. The distance between the coils and the tool surface is preferably in the range from 1/16 inch to 3/4 inch, but may be larger. Transmitter coil 704 and receiver coil 712 may each have a tilt angle of about 45° and be aligned with the same azimuthal angle, while receiver coil 710 may have a tilt angle of about 45° and an azimuthal angle of 180° apart from receiver coil 712 (or equivalently, a tilt angle of minus 45° at the same azimuth angle as receiver coil 712).

Figure 8A:
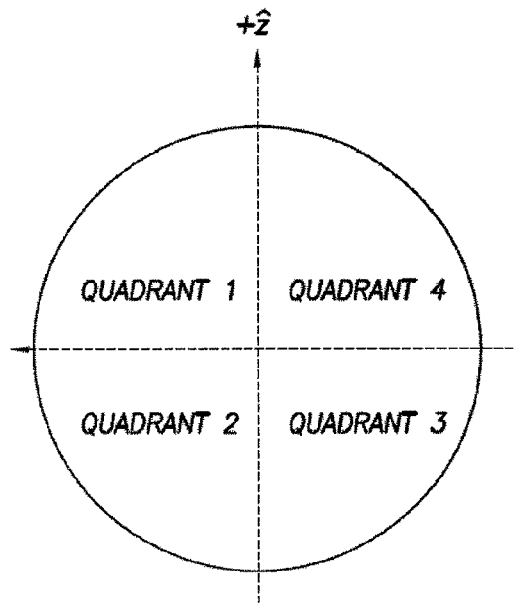
FIGS. 8a and 8b show an illustrative configuration of an antenna system equipped with a tilted transmitter and a tilter receiver.
Figure 8B:
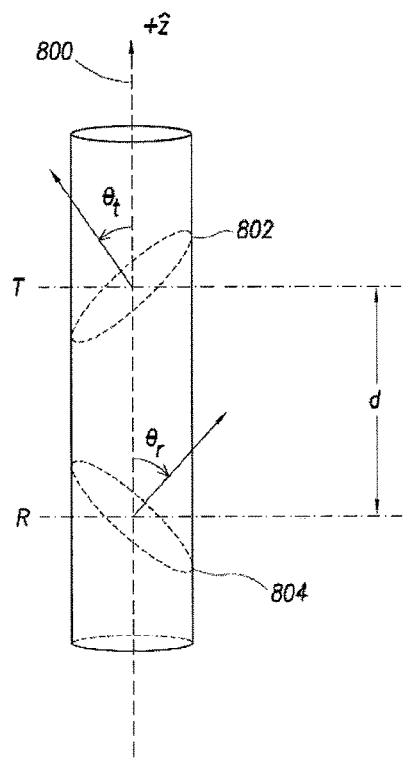

The signal measured by a tilted receiver in response to the firing of a tilted transmitter can be expressed in terms of the signals $v_I^J$ that would be measured by the tool of FIG. 4. Specifically, FIGS. 8a and 8b depict a configuration of an antenna system equipped with a tilted transmitter 802 and a tilted receiver 804 in accordance with an embodiment of the present invention. As shown in FIG. 8a, the Cartesian coordinate system may be divided into 4 quadrants.

An electromagnetic resistivity logging tool may then be provided which may include a rotational position sensor. The electromagnetic resistivity logging tool may further include a first transmitter antenna oriented in the first quadrant. A receiver antenna may be oriented in the first quadrant or the third quadrant which is located diagonal to the first quadrant. A second transmitter may be oriented in one of the second quadrant or the fourth quadrant. As shown in FIG. 8a, each of the second quadrant and the fourth quadrant are located adjacent to the first quadrant. With substantially same distance between the first transmitter antenna and the receiver antenna and the second transmitter antenna and the receiver antenna, the following steps may be performed as discussed in more detail below. First, an expression of raw measurements at the receiver antenna in response to the firing of the first transmitter may be obtained as a first expression. Next, an expression of raw measurements at the receiver antenna in response to firing of the second transmitter may be determined as a second expression. The first expression and the second expression may then be used to obtain an expression for the processed signals matching to forward model responses of the system.

When both transmitter and receiver coils are oriented at the same azimuth angle β, the tilted receiver signal $V_R^T$ is $$V_R^T(\beta) = \begin{bmatrix} \sin\theta_t\cos\beta \\ \sin\theta_t\sin\beta \\ \cos\theta_t \end{bmatrix}^T \begin{bmatrix} v_x^x & v_y^x & v_z^x \\ v_x^y & v_y^y & v_z^y \\ v_x^z & v_y^z & v_z^z \end{bmatrix} \begin{bmatrix} \sin\theta_r\cos\beta \\ \sin\theta_r\sin\beta \\ \cos\theta_r \end{bmatrix} = \quad (3)$$

$$\begin{bmatrix} \sin\theta_t\cos\beta \\ \sin\theta_t\sin\beta \\ \cos\theta_t \end{bmatrix}^T v_M \begin{bmatrix} \sin\theta_r\cos\beta \\ \sin\theta_r\sin\beta \\ \cos\theta_r \end{bmatrix}$$

where, $\theta_t$ is the tilt angle of the transmitter related to the z-axis which is denoted by line 800 of FIG. 8b; $\theta_r$ is the tilt angle of the receiver related to the z-axis which is denoted by line 800; $v_I^J$ is a complex value representing the signal amplitude and phase shift measured by the receiver 804 in the I-directional dipole in response to firing of transmitter 802 in the J-directional dipole; and $v_M$ is the 3×3 complex voltage matrix corresponding to $v_I^J$. As would be appreciated by those of ordinary skill in the art, with the benefit of this disclosure, $v_I^J$ in Eq. (3) is affected by environmental conditions. Specifically, $v_I^J$ in Eq. (3) may be affected by two environmental conditions, a surrounding target such as a casing in a homogeneous isotropic medium and a surrounding boundary.

Figure 9A:
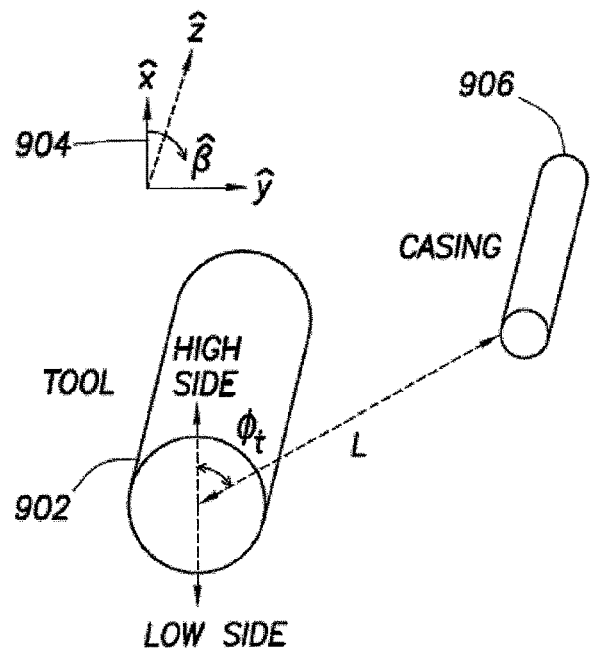
Figure 9B:
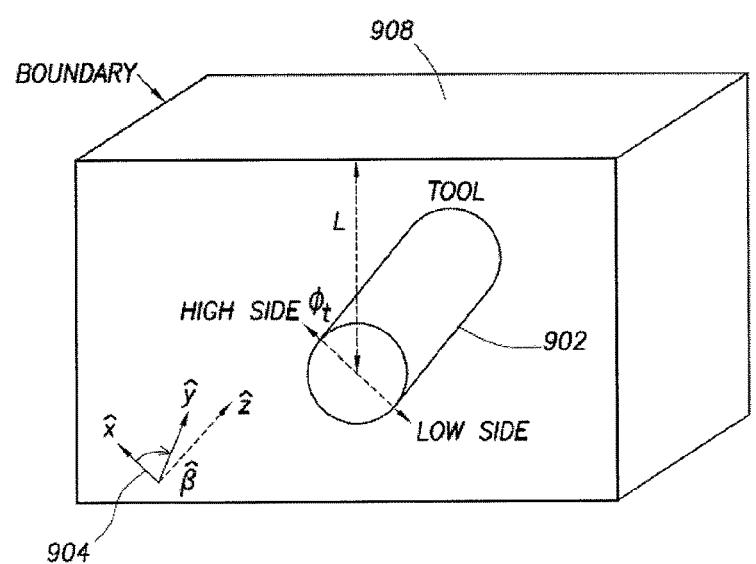

FIG. 9a depicts configuration of a rotating tool's relationship to surrounding casing and FIG. 9b depicts configuration of a rotating tool's relationship to a surrounding boundary and FIG. 9c depicts configuration of a rotating tool's relationship to electrical anisotropy of a thinly laminated formation.

With reference to FIG. 9c, electrical anisotropy exists in laminated thin layers 910 each with different resistivity values, producing a higher resistivity in the direction perpendicular to the fracture plan (vertical resistivity Rv, as shown on axis 912) than the resistivity (horizontal resistivity Rh, as shown on axis 912) in the parallel direction. While operating the tool 902 downhole in an anisotropic formation, the tool's 902 highside may not point to the formation plane where horizontal resistivity Rh exists. Therefore, measurements will be affected by the azimuth difference $\phi_t$ between the tool's 902 high side and the direction pointing to the formation plane 910.

As shown in FIGS. 9a, 9b and 9c, all environments present a relative azimuthal angle $\phi_t$ between the coordinate defined by the tool 902 and surrounding environments. While operating a tool 902 downhole, a z-directional axis of the tool's Cartesian coordinate system 904 may be selected based on the tool's current borehole path. Similarly, an azimuthal angle β for the tool may be determined in the x-y plane of the tool Cartesian coordinate system 904. Specifically, the x-directional axis may be defined in the high side of tool 902 based on magnetometer and/or gravity system of the tool 902 with corresponding azimuthal angle of zero. Accordingly, as depicted in FIGS. 9a, 9b, and 9c, the angle $\phi_t$ between high side direction of the tool 902 and the direction with the closest distance (L) to the casing position 906 as shown in FIG. 9a, a boundary plane 908 as shown in FIG. 9b, or a thinly laminated formation 910 is herein defined as relative azimuthal angle $\phi_t$.

In order to determine the relative azimuthal angle $\phi_t$, the high side of the tool 902 may be hypothetically rotated along with the z-axis of the tool Cartesian coordinate system 904 toward the target in FIG. 9. Accordingly, by applying the rotating angle $\phi_t$ into Eq. (3), the measured angle in response to the new azimuthal angle β' defined in the rotated Cartesian coordinate system denoted x', y', and z' as shown in FIG. 10 may be given by $$V_R^T(\beta') = \begin{bmatrix} \sin\theta_t\cos\beta' \\ \sin\theta_t\sin\beta' \\ \cos\theta_t \end{bmatrix}^T \begin{bmatrix} v_x'^x & v_y'^x & v_z'^x \\ v_x'^y & v_y'^y & v_z'^y \\ v_x'^z & v_y'^z & v_z'^z \end{bmatrix} \begin{bmatrix} \sin\theta_r\cos\beta' \\ \sin\theta_r\sin\beta' \\ \cos\theta_r \end{bmatrix} = \quad (4)$$

$$\begin{bmatrix} \sin\theta_t\cos\beta' \\ \sin\theta_t\sin\nu \\ \cos\theta_t \end{bmatrix}^T v_M' \begin{bmatrix} \sin\theta_r\cos\beta' \\ \sin\theta_r\sin\beta' \\ \cos\theta_r \end{bmatrix}$$

where β' equals (β+$\phi_t$) and $v'_M$ is a 3×3 complex voltage matrix corresponding to $v'_I{}^J$ measured in the rotated Cartesian coordinate system or a new Cartesian coordinate system with the x-directional axis pointing to the surrounding target. Specifically, the relationship when the Cartesian coordinate system is rotated along with the z-directional axis with a clockwise relative azimuthal angle $\phi_t$ in the x-y plane may be characterized as shown in FIG. 10.

Figure 10:
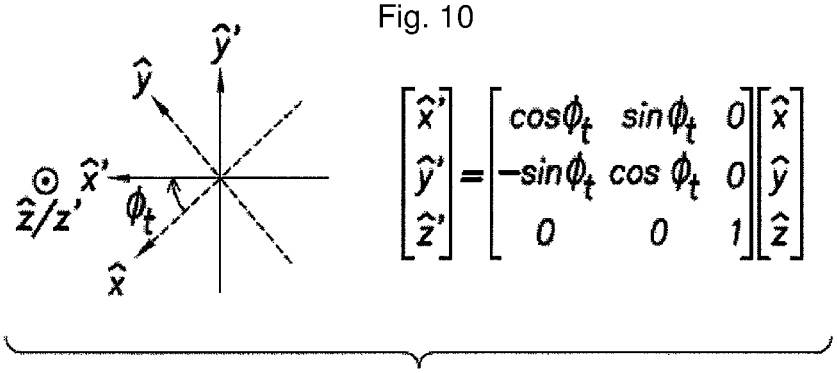
FIG. 10 shows an illustrative Cartesian coordinate system that is rotated along z-directional axis with a clockwise angle $\phi_r$ in the x-y plane.

Because the high side of the tool 902 points to the target after the rotation of the Cartesian coordinate system 904 as shown in FIG. 10, based on the electromagnetic concept, Equation (4) may be simplified as:

$$V_R^T(\beta') = \begin{bmatrix} \sin\theta_t\cos\beta' \\ \sin\theta_t\sin\beta' \\ \cos\theta_t \end{bmatrix}^T \begin{bmatrix} v_x'^x & 0 & v_z'^x \\ 0 & v_y'^y & 0 \\ v_x'^z & 0 & v_z'^z \end{bmatrix} \begin{bmatrix} \sin\theta_r\cos\beta' \\ \sin\theta_r\sin\beta' \\ \cos\theta_r \end{bmatrix} = \quad (5)$$

$$\begin{bmatrix} \sin\theta_t\cos\beta' \\ \sin\theta_t\sin\beta' \\ \cos\theta_t \end{bmatrix}^T v'_M \begin{bmatrix} \sin\theta_r\cos\beta' \\ \sin\theta_r\sin\beta' \\ \cos\theta_r \end{bmatrix} \quad (5)$$

The relationship between Eq. (3) and Eq. (5) is the rotation of the Cartesian coordinate system 904 of the tool 902 along the z-directional axis and may be described by the relative azimuthal angle $\phi_r$ as shown in FIG. 10. Based on the relationship shown in FIG. 10, $v'_M$ may be obtained as:

$$v'_M = \begin{bmatrix} \cos\phi_t & \sin\phi_t & 0 \\ -\sin\phi_t & \cos\phi_t & 0 \\ 0 & 0 & 1 \end{bmatrix} v_M \begin{bmatrix} \cos\phi_t & \sin\phi_t & 0 \\ -\sin\phi_t & \cos\phi_t & 0 \\ 0 & 0 & 1 \end{bmatrix} \quad (6)$$

As would be appreciated by those of ordinary skill in the art, with the benefit of this disclosure, if only one surrounding target is considered, four equations related to the measured complex voltage components $v_I^J$ may be derived as shown below:

$$v_x^y + v_y^x = 0 \quad (7a)$$

$$(v_x^x + v_y^y)\cos\phi_t \sin\phi_t + v_x^y \sin^2\phi_t + v_y^x \cos^2\phi_t = 0 \quad (7b)$$

$$v_x^z \sin\phi_t + v_y^z \cos\phi_t = 0 \quad (7c)$$

$$-v_z^x \sin\phi_t + v_z^y \cos\phi_t = 0 \quad (7d)$$

In order to analyze Eq. (7), two conditions may be taken into consideration. The first assumed condition is instances where the rotation angle $\phi_r$ is assumed to be either $\pi/2$ (90°) or $3\pi/2$ (270°). Under the first assumed condition from Eq. (7), it may be concluded that $v_y^x = v_x^y = v_z^x = v_x^z = 0$. Therefore, the measured raw signal presented in Eq. (3) may be expressed as:

$$V_R^T(\beta) = \begin{bmatrix} \sin\theta_t\cos\beta \\ \sin\theta_t\sin\beta \\ \cos\theta_t \end{bmatrix}^T \begin{bmatrix} v_x^x & 0 & 0 \\ 0 & v_y^y & v_z^y \\ 0 & v_y^z & v_z^z \end{bmatrix} \begin{bmatrix} \sin\theta_r\cos\beta \\ \sin\theta_r\sin\beta \\ \cos\theta_r \end{bmatrix} \quad (8)$$

$$= \left(\frac{v_x^x}{2}\sin\theta_t\sin\theta_r - \frac{v_y^y}{2}\sin\theta_t\sin\theta_r\right)\cos 2\beta + (v_y^z\cos\theta_t\sin\theta_r + v_z^y\sin\theta_t\cos\theta_r)\sin\beta + \left(\frac{v_x^x}{2}\sin\theta_t\sin\theta_r + \frac{v_y^y}{2}\sin\theta_t\sin\theta_r + v_z^z\cos\theta_t\cos\theta_r\right)$$

$$= V_1\cos 2\beta + V_2\sin\beta + V_3$$

where $V_1$, $V_2$, and $V_3$ may be determined by current environments and tool 902 antenna structures as:

$$V_1 = \frac{v_x^x}{2}\sin\theta_t\sin\theta_r - \frac{v_y^y}{2}\sin\theta_t\sin\theta_r$$

$$V_2 = v_y^z\cos\theta_t\sin\theta_r + v_z^y\sin\theta_t\cos\theta_r$$

$$V_3 = \frac{v_x^x}{2}\sin\theta_t\sin\theta_r + \frac{v_y^y}{2}\sin\theta_t\sin\theta_r + v_z^z\cos\theta_t\cos\theta_r$$

On the other hand, under a second assumed condition, if the rotation angle $\phi_r$ is neither $\pi/2$ (90°) nor $3\pi/2$ (270°), the following relationships may be derived from Eq. (7):

$$v_x^y = -v_y^x \quad (9a)$$

$$\begin{cases} v_y^y = -\frac{1}{2}\tan(2\phi_t)(v_x^x + v_y^y), & \text{if } \cos(2\phi_t) \neq 0 \\ v_x^x = -v_y^y, & \text{if } \cos(2\phi_t) = 0 \end{cases} \quad (9b)$$

$$v_y^z = -v_x^z\tan\phi_t \quad (9c)$$

$$v_z^y = v_z^x\tan\phi_t \quad (9d)$$

and therefore, the measured raw signal may be modified as:

(10)

$$V_R^T(\beta) = \begin{cases} \begin{bmatrix} \sin\theta_t\cos\beta \\ \sin\theta_t\sin\beta \\ \cos\theta_t \end{bmatrix}^T \begin{bmatrix} v_x^x & -\frac{1}{2}\tan(2\phi_t)(v_x^x + v_y^y) & v_z^x \\ \frac{1}{2}\tan(2\phi_t)(v_x^x + v_y^y) & v_y^y & v_z^x\tan\phi_t \\ v_x^z & -v_x^z\tan\phi_t & v_z^z \end{bmatrix} \begin{bmatrix} \sin\theta_r\cos\beta \\ \sin\theta_r\sin\beta \\ \cos\theta_r \end{bmatrix}, & \text{if } \cos(2\phi_t) \neq 0 \\[2em] \begin{bmatrix} \sin\theta_t\cos\beta \\ \sin\theta_t\sin\beta \\ \cos\theta_t \end{bmatrix}^T \begin{bmatrix} v_x^x & v_y^x & v_z^x \\ -v_y^x & -v_y^y & v_z^x\tan\phi_t \\ v_x^z & -v_x^z\tan\phi_t & v_z^z \end{bmatrix} \begin{bmatrix} \sin\theta_r\cos\beta \\ \sin\theta_r\sin\beta \\ \cos\theta_r \end{bmatrix}, & \text{if } \cos(2\phi_t) = 0 \end{cases}$$

$$= \left(\frac{v_x^x\sin\theta_t\sin\theta_r}{2} - \frac{v_y^y\sin\theta_t\sin\theta_r}{2}\right)\cos 2\beta + (v_x^z\cos\theta_t\sin\theta_r + v_z^x\sin\theta_t\cos\theta_r)\cos\beta +$$

$$(v_z^z\sin\theta_t\cos\theta_r - v_x^z\cos\theta_t\sin\theta_r)\tan\phi_t\sin\beta + \left(\frac{v_x^x\sin\theta_t\sin\theta_r}{2} + \frac{v_y^y\sin\theta_t\sin\theta_r}{2} + v_z^z\cos\theta_t\cos\theta_r\right)$$

$$= V_1\cos 2\beta + V_4\cos\beta + V_5\sin\beta + V_3$$

Again, $V_4$ and $V_5$ may be determined by the existing environment and tool 902 antennal structures where $V_4 = v_x^z \cos\theta_t \sin\theta_r + v_z^x \sin\theta_t \cos\theta_r$ and $V_5 = (v_z^x \sin\theta_t \cos\theta_r - z_x^z \cos\theta_t \sin\theta_r)\tan\phi_t$.

Equations (8) and (10) provide a better understanding of raw measurements from a rotating tool equipped with a tilt antenna system with only one surrounding target. In order to simplify the analysis, the forwarding model normally only considers one target surrounding the tool 902 with its high side pointing to that target. As a result, in instances where there is more than one target surrounding the tool 902, and/or there is a significant relative azimuthal angle $\phi_r$, the modeling responses could explain real behaviors of tool measurements but not get accurate inversion results. Consequently before inverting formation parameters based on raw measurements, it is desirable to process the raw measurements first to obtain better signal quality that is closer to the modeling responses. Eq. (5) represents the modeling responses and may be expressed as:

$$V_R^T(\beta') = \left[\left(\frac{v_x'^x \sin\theta_t \sin\theta_r}{2} - \frac{v_y'^y \sin\theta_t \sin\theta_r}{2}\right)\cos 2\beta'\right] + \quad (11)$$
$$[(v_x'^z \cos\theta_t \sin\theta_r + v_z'^x \sin\theta_t \cos\theta_r)\cos\beta'] +$$
$$\left(v_z'^z \cos\theta_t \cos\theta_r + \frac{v_x'^x \sin\theta_t \sin\theta_r}{2} + \frac{v_y'^y \sin\theta_t \sin\theta_r}{2}\right)$$

Based on Eq. (6) and Eqs. (7a)-(7d), if $\phi_t$ is $\pi/2$ (90°) or $3\pi/2$ (270°), Eq. (11) may be rewritten as:

$$V_R^T(\beta') = \left[\left(\frac{v_x^x \sin\theta_t \sin\theta_r}{2} - \frac{v_y^y \sin\theta_t \sin\theta_r}{2}\right)\cos 2\beta'\right] + \quad (12)$$
$$[(v_z^y \sin\theta_t \cos\theta_r - v_z^x \cos\theta_t \sin\theta_r)\sin\phi_t \cos\beta'] +$$
$$\left(v_z^z \cos\theta_t \cos\theta_r + \frac{v_x^x \sin\theta_t \sin\theta_r + v_y^y \sin\theta_t \sin\theta_r}{2\cos 2\phi_t}\right)$$
$$= V_1 \cos 2\beta' + V_6 \sin\phi_t \cos\beta' + V_7$$

where $V_6 = v_z^y \sin\theta_t \cos\theta_r - v_y^x \cos\theta_t \sin\theta_r$ and $$V_7 = v_z^z \cos\theta_t \cos\theta_r + \frac{v_x^x \sin\theta_t \sin\theta_r + v_y^y \sin\theta_t \sin\theta_r}{2\cos 2\phi_t}.$$

In contrast, if the rotation angle $\phi_t$ is neither $\pi/2$ (90°) nor $3\pi/2$ (270°), Eq. (11) may be modified as:

$$V_R^T(\beta') = \left[\left(\frac{v_x^x \sin\theta_t \sin\theta_r}{2} - \frac{v_y^y \sin\theta_t \sin\theta_r}{2}\right)\cos 2\beta'\right] + \quad (13a)$$
$$\left[\frac{(v_x^z \cos\theta_t \sin\theta_r + v_z^x \sin\theta_t \cos\theta_r)}{\cos\phi_t}\cos\beta'\right] +$$
$$\left(v_z^z \cos\theta_t \cos\theta_r + \frac{v_x^x \sin\theta_t \sin\theta_r + v_y^y \sin\theta_t \sin\theta_r}{2\cos 2\phi_t}\right)$$
$$= V_1 \cos 2\beta' + \frac{V_4}{\cos\phi_t}\cos\beta' + V_7, \text{ if } \cos(2\phi_t) \neq 0$$

$$V_R^T(\beta') = \left[\left(\frac{v_x^x \sin\theta_t \sin\theta_r}{2} - \frac{v_y^y \sin\theta_t \sin\theta_r}{2}\right)\cos 2\beta'\right] + \quad (13b)$$
$$\left[\frac{(v_x^z \cos\theta_t \sin\theta_r + v_z^x \sin\theta_t \cos\theta_r)}{\cos\phi_t}\cos 2\beta'\right] +$$
$$(v_z^z \cos\theta_t \cos\theta_r + v_x^y \sin\theta_t \sin\theta_r \sin 2\phi_t)$$
$$= V_1 \cos 2\beta' + \frac{V_4}{\cos\phi_t}\cos\beta' + V_8, \text{ if } \cos(2\phi_t) = 0$$

where $V_8 = v_z^z \cos\theta_t \cos\theta_r + v_x^y \sin\theta_t \sin\theta_r \sin 2\phi_t$.

Accordingly, Eq. (8) and Eq. (10) present signal behaviors of raw tool measurements in an environment condition of a relative azimuthal angle $\phi_t$ toward surrounding target, whereas Eq. (12) and Eqs. (13a) and (13b) demonstrate how forwarding model signals are presented by the measured raw signals. Consequently, these equations provide processing schemes on raw measurements to match to forwarding model responses. As would be appreciated by those of ordinary skill in the art, with the benefit of this disclosure, the relationships identified in Equations (8), (10), (12) and (13a)-(13b) may be used to reveal that the amplitude of double sine wave responses is consistent. Accordingly, these equations may be used to match raw measurements to forwarding model responses.

Figure 11:
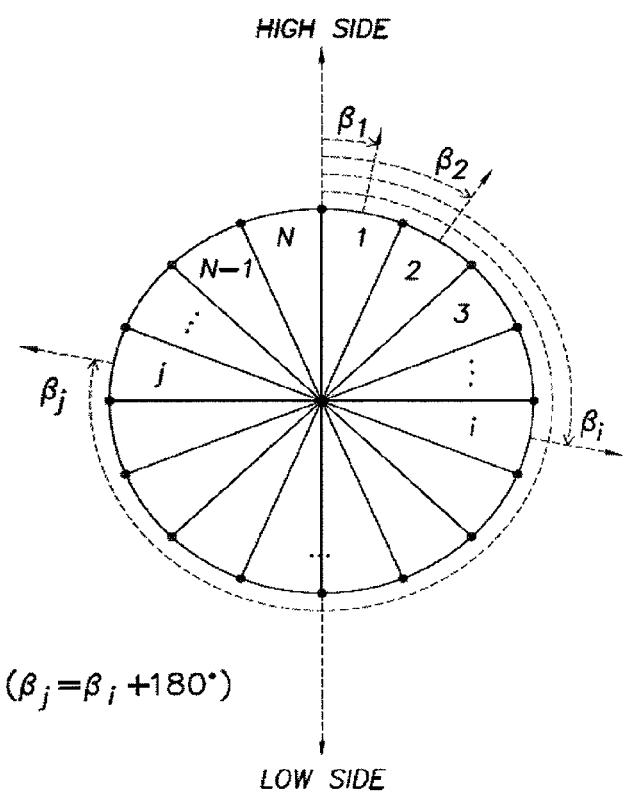
FIG. 11 shows an illustrative configuration of tool bin positions and corresponding azimuthal angles.

FIG. 11 depicts the configuration of the bin positions and corresponding azimuthal angles of a tool 902 in accordance with an embodiment of the present invention. As shown in FIG. 11, N is the total number of bins in the rotating tool 902 and a bin i with azimuthal angle $\beta_i$ and a bin j with azimuthal angle $\beta_j$ are located opposite each other so that $\beta_i = \beta_j + 180°$.

Figure 12:
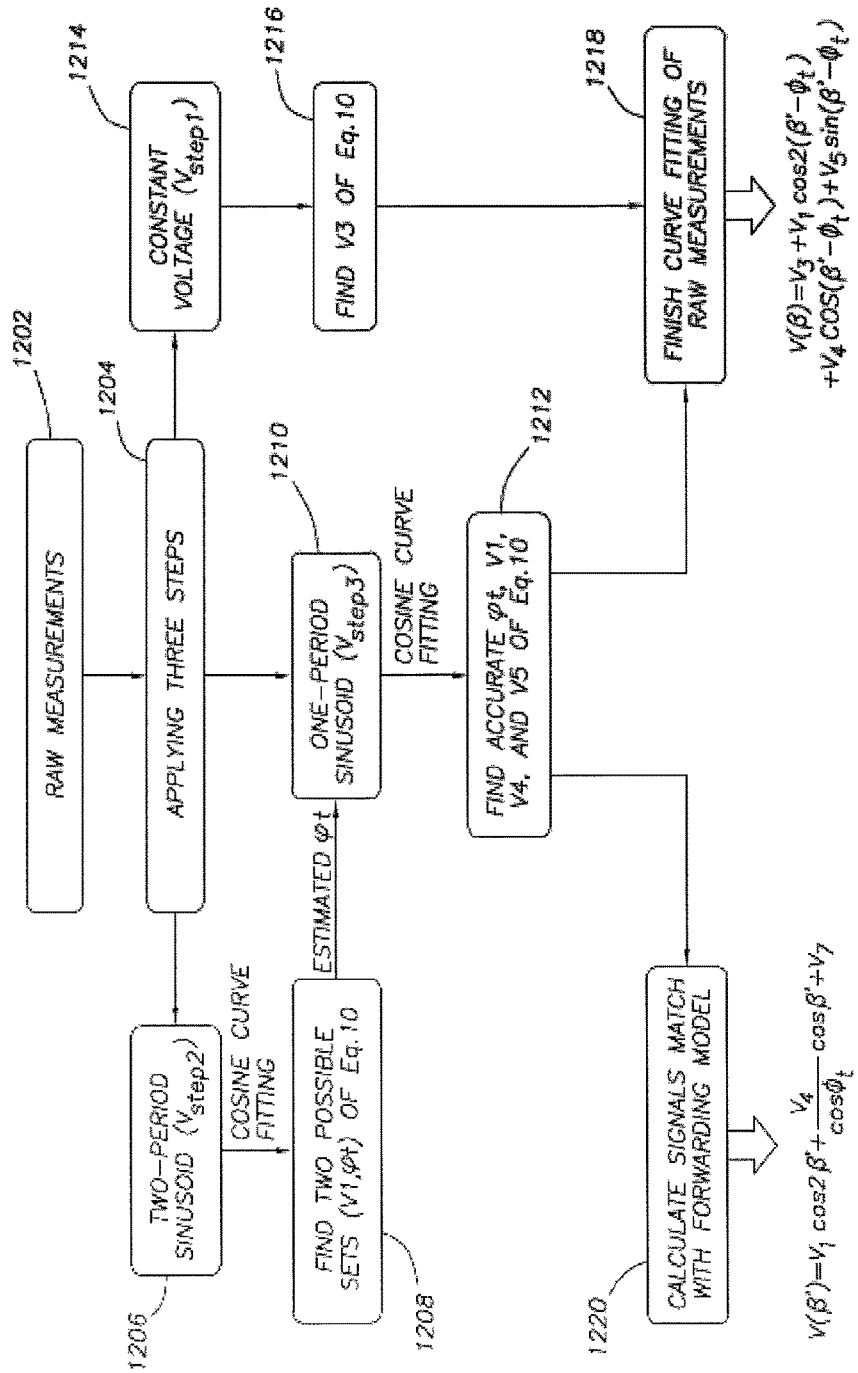
FIG. 12 shows a flowchart of a processing scheme in accordance with an exemplary embodiment of the present invention.

FIG. 12 depicts a flow chart for the proposed processing scheme of the raw measurements in accordance with an embodiment of the present invention. First, at step 1202, raw measurements are obtained from the tool 902. As would be appreciated by those of ordinary skill in the art, with the benefit of this disclosure, obtaining raw measurements from the tool 902 is well known in the art and will therefore not be discussed in detail herein. Once the raw measurements are obtained, they may be processed in accordance with an embodiment of the present invention.

The calculations in accordance with an embodiment of the present invention may be simplified by assuming that the rotating angle $\phi_t$ is neither $\pi/2$ (90°) nor $3\pi/2$ (270°) and accordingly, $\cos(2\phi_t) \neq 0$. As would be appreciated by those of ordinary skill in the art, with the benefit of this disclosure, this assumption does not exclude other rotating angles from the proposed processing scheme and is merely used to simplify the conditions to obtain the following general expressions for the proposed processing scheme. Accordingly, the methods disclosed herein are applicable to any rotating angle in implementation. Under the assumed condition that the rotating angle $\phi_t$ is neither $\pi/2$ (90°) nor $3\pi/2$ (270°) and using a tool as shown in FIG. 11, three steps may be used to analyze the raw measurements in step 1204. In the first step, all the bin measurements are averaged as follows to obtain $V_{step1}$:

$$V_{Step1} \equiv \frac{1}{N}\sum_{i=1}^{N} V_R^T(\beta_i)$$

Next, step 2 entails averaging two raw complex voltage measurements where one is in a bin direction and the other is in the opposite bin direction. Specifically, $V_{step2}$ may be determined as:

$$V_{Step2}(\beta_i) \equiv \frac{V_R^T(\beta_i) + V_R^T(\beta_j)}{2} - V_{step1}, i = 1, 2, \ldots, N$$

Finally, step 3 is averaging the subtraction of one raw measurement in a bin direction from the other raw measurement in opposite bin direction to obtain $V_{step3}$ as follows:

$$V_{Step3}(\beta_i) \equiv \frac{V_R^T(\beta_i) - V_R^T(\beta_j)}{2}$$

The three steps above may be used to distribute the raw measurements of Eq. (10) into three parts: (1) a complex voltage; (2) azimuthal voltages as a sinusoid wave response with double periods; and (3) azimuthal voltages as a sinusoid wave response with a single period with respect to tool's azimuthal angle (0~360°), or the tool's bin 1 to bin N as shown in FIG. 11).

As would be appreciated by those of ordinary skill in the art, with the benefit of this disclosure, both cosine wave fitting and sine wave fitting functions may be used to fit processed responses. Specifically, because cosine wave and sine wave responses are theoretically similar except for a 180° phase shift, the only difference between cosine and sine fitting functions is 180° phase shift on estimated $\phi_r$. Accordingly, the methods and systems disclosed herein may be carried out using both sine wave or cosine wave fitting methods.

After applying the three steps, at step 1206, the second step with two period sinusoid wave responses is examined. As discussed above, the amplitude of the cosine wave responses of the second step remains the same, regardless of the relative azimuthal rotation angle $\phi_r$. As a result, investigation of this part will provide a good estimated result for the relative azimuthal rotation angle $\phi_r$. Since the response at this second step is a sinusoid wave with two period, there are four rotation angles that may be found by cosine curve fitting. Cosine curve fitting is well known to those of ordinary skill in the art and will therefore not be discussed in detail herein. After the cosine curve fitting is performed and four rotation angles are determined, at step 1208, the process may be simplified by only considering the two smallest values obtained for the relative azimuthal rotation angle $\phi_r$, where one of the two values could be the real value of $\phi_t$ and the other will be either ($\phi_r$+90°) or ($\phi_r$−90°) depending on which absolute value is smaller. Accordingly, at step 1208, the amplitude (V1 from Eq. (10)) corresponding to each of the values of the relative azimuthal rotation angle $\phi_r$ may be determined. Once the value of V1 (from Eq. (10)) and the two possible values of relative azimuthal rotation angle $\phi_t$ are known, at step 1210, a single period sinusoid wave is identified. Next, cosine curve fitting is utilized and the two computed relative azimuthal rotation angles $\phi_r$ may be used to calculate the corresponding amplitude of V4 and V5 (from Eq. (10)). Specifically, the two possible values of the relative azimuthal rotation angle $\phi_t$ are applied to step 1210 to identify the correct value of the relative azimuthal rotation angle $\phi_t$ as well as V4 and V5 in Eq. (10). The two possible values of the relative azimuthal rotation angle $\phi_t$ will cause different estimated values of V4 and V5 after cosine curve fitting between steps 1210 and 1212.

Next, at step 1212, an accurate value for the relative azimuthal rotation angle $\phi_t$, V1, V4, and V5 of Eq. (10) may be determined. Based on the distinct tilt angle designs of the antenna system, V4 may be larger than V5 in amplitude for some tilt transmitter and tilt receiver designs and V4 may be smaller than V5 in amplitude for other tilt antenna designs. Knowing the antenna structure in advance, one can differ V4 and V5 in their amplitudes. Accordingly, an accurate relative azimuthal rotation angle $\phi_t$ may be obtained by applying the two estimated values found in the second step and the third step and then comparing the corresponding amplitudes of V4 and V5. Specifically, the correct value of the relative azimuthal rotation angle $\phi_t$ may be determined when (1) the tilt angles of Tx and Rx are known; (2) two possible values of the relative azimuthal rotation angle $\phi_t$ are identified in step 1208; (3) V4 and V5 values are calculated based on two possible values of the relative azimuthal rotation angle $\phi_t$ and (4) the absolute amplitude of V4 and V5 are known and can be compared.

In one exemplary embodiment, a constant voltage of the first step is obtained at step 1214, which is the value of V3 in Eq. (10) at step 1216. Next, at step 1216, the constant voltage of the third step may be used to determine the value of V3 in Eq. (10). Using the value of V3 obtained in step 1216 in conjunction with the values obtained for V1, V4, V5 and $\phi_t$, the raw measurement may be curve-fitted and described as Eq. 10 at step 1218.

In another exemplary embodiment, once the values for V1, V4, V5 and $\phi_t$ are determined, at step 1220 the signal's match with the forwarding model may be determined as shown in FIG. 12.

However, as would be appreciated by those of ordinary skill in the art, with the benefit of this disclosure, using a single tilt transmitter-receiver pair does not permit matching raw measurements of Eq. (10) to the modeling responses of Eq. (13a) because calculating V7 in Eq. (13a) requires the evaluation of values of the measured voltage components of $V_z^z$ and $V_x^x+V_y^y$. In order to overcome this problem, a two antenna system design with the same spacing between transmitter and receiver but different tilt angles of transmitter or different tilt angles of receiver such as the one depicted in FIG. 13 may be used. In one exemplary embodiment, a commercially available azimuthal directional resistivity tool with a tilt transmitter and a tilt receiver (ADR-TT) such as ones available from Halliburton Energy Services of Duncan, Okla., may be used.

Figure 13:
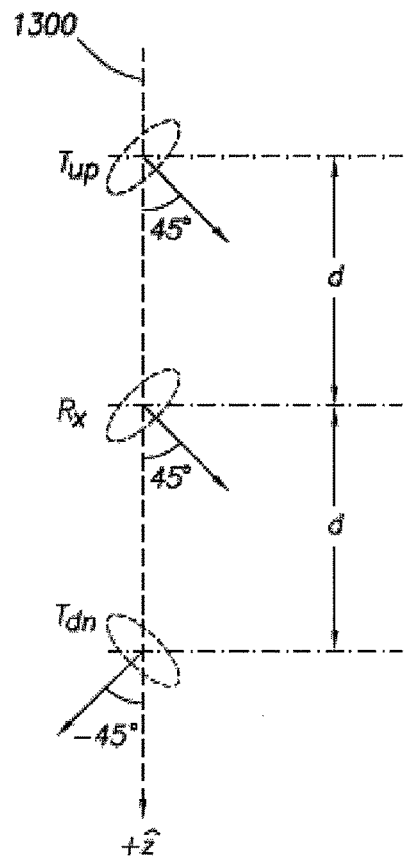
FIG. 13 shows an illustrative configuration of an antenna system with two transmitters and one receiver.

As shown in FIG. 13, transmitters and receivers may be placed along an axis 1300. A distance d between upper transmitter $T_{up}$ and central receiver Rx may be the same as the distance between lower transmitter $T_{dn}$ and central receiver Rx. However, the upper transmitter $T_{up}$ and the central receiver RX are parallel to each other while the lower transmitter $T_{dn}$ and the central receiver Rx are perpendicular to each other. Accordingly, the raw measured signals received in the central receiver Rx in response to firing of the upper transmitter $T_{up}$ may be represented as:

$$V_{R_x}^{T_{up}}(\beta) = \left[\left(\frac{v_x^x}{4} - \frac{v_y^y}{4}\right)\cos 2(\beta' - \phi_t)\right] + \left[\frac{1}{2}(v_x^z + v_z^x)\cos(\beta' - \phi_t) + \frac{1}{2}(v_z^x - v_x^z)\tan\phi_t\sin(\beta' - \phi_t)\right] + \left(\frac{v_x^x}{4} + \frac{v_y^y}{4} + \frac{v_z^z}{2}\right) \quad (14a)$$

In contrast, the measured signals receiver in the center receiver Rx in response to firing of lower transmitter $T_{dn}$ may be represented as:

$$V_{R_x}^{T_{dn}}(\beta) = \left[\left(\frac{v_x^x}{4} - \frac{v_y^y}{4}\right)\cos 2(\beta' - \phi_t)\right] + \left[\frac{1}{2}(v_x^z - v_z^x)\cos(\beta' - \phi_t) - \frac{1}{2}(v_z^x + v_x^z)\tan\phi_t\sin(\beta' - \phi_t)\right] + \left(\frac{v_x^x}{4} + \frac{v_y^y}{4} - \frac{v_z^z}{2}\right) \quad (14b)$$

Accordingly, after performing the first step procedure on both Eq. (14a) and Eq. (14b), the constant complex voltages may be expressed as:

$$V_{Step1\_TupRx} = \frac{v_x^x}{4} + \frac{v_y^y}{4} + \frac{v_z^z}{2} \quad (15a)$$

$$V_{Step1\_TdnRx} = \frac{v_x^x}{4} + \frac{v_y^y}{4} - \frac{v_z^z}{2} \quad (15b)$$

Consequently, the processed signals matching to the forwarding model responses may be represented as:

$$V_{R_x}^{T_{up}}(\beta') = \left[\left(\frac{v_x^x}{4} - \frac{v_y^y}{4}\right)\cos 2\beta'\right] + \left[\frac{1}{2\cos\phi_t}(v_x^z + v_z^x)\cos\beta'\right] + \left(\frac{V_{Step1\_TupRx} - V_{Step1\_TdnRx}}{2}\right) + \left(\frac{V_{Step1\_TupRx} + V_{Step1\_TdnRx}}{2\cos(2\phi_t)}\right) \quad (16a)$$

$$V_{R_x}^{T_{dn}}(\beta') = \left[\left(\frac{v_x^x}{4} - \frac{v_y^y}{4}\right)\cos 2\beta'\right] + \left[\frac{1}{2\cos\phi_t}(v_x^z - v_z^x)\cos\beta'\right] + \left(\frac{V_{Step1\_TdnRx} - V_{Step1\_TupRx}}{2}\right) + \left(\frac{V_{Step1\_TdnRx} + V_{Step1\_TupRx}}{2\cos(2\phi_t)}\right) \quad (16b)$$

As would be appreciated by those of ordinary skill in the art, with the benefit of this disclosure, the methods and systems disclosed herein are applicable to antenna systems with arbitrary tilt angle for transmitters (Tx) and receivers (Rx). The systems and methods disclosed herein are not limited to any specific antenna configuration and may be applied to a number of systems, including, but not limited to, antenna systems having one tilt Tx and one tilt Rx, combinations of two tilt Txs and one Rx, combinations of two tilt Rxs and one Tx, or combinations of multiple tilt Txs and multiple tilt Rxs. Moreover, the tilt angles of the transmitters and receivers may be the same or different. Further, as would be appreciated by those of ordinary skill in the art, with the benefit of this disclosure, based on the reciprocity theorem, antennas may operate equally well as transmitters or receivers. Accordingly, an antenna may be applied as a transmitter in one implementation and as a receiver in another. As a result, all the configurations of transmitters-receivers of the antenna systems disclosed herein may be interchangeable. Specifically, transmitters may be used as receivers and receivers may be used as transmitters.

EXAMPLE I

Figure 14:
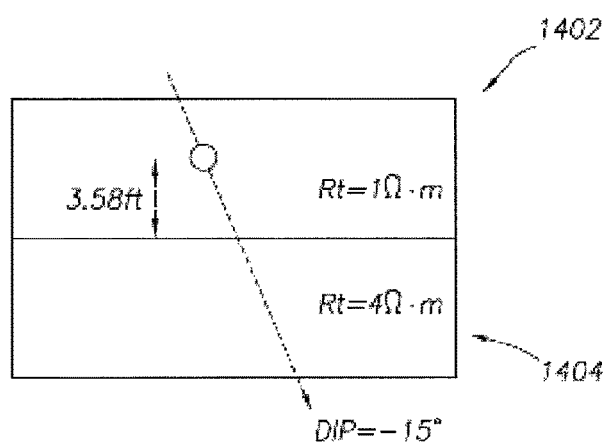
FIG. 14 shows an illustrative configuration of a formation model of two layered isotropic media.
Figure 15:
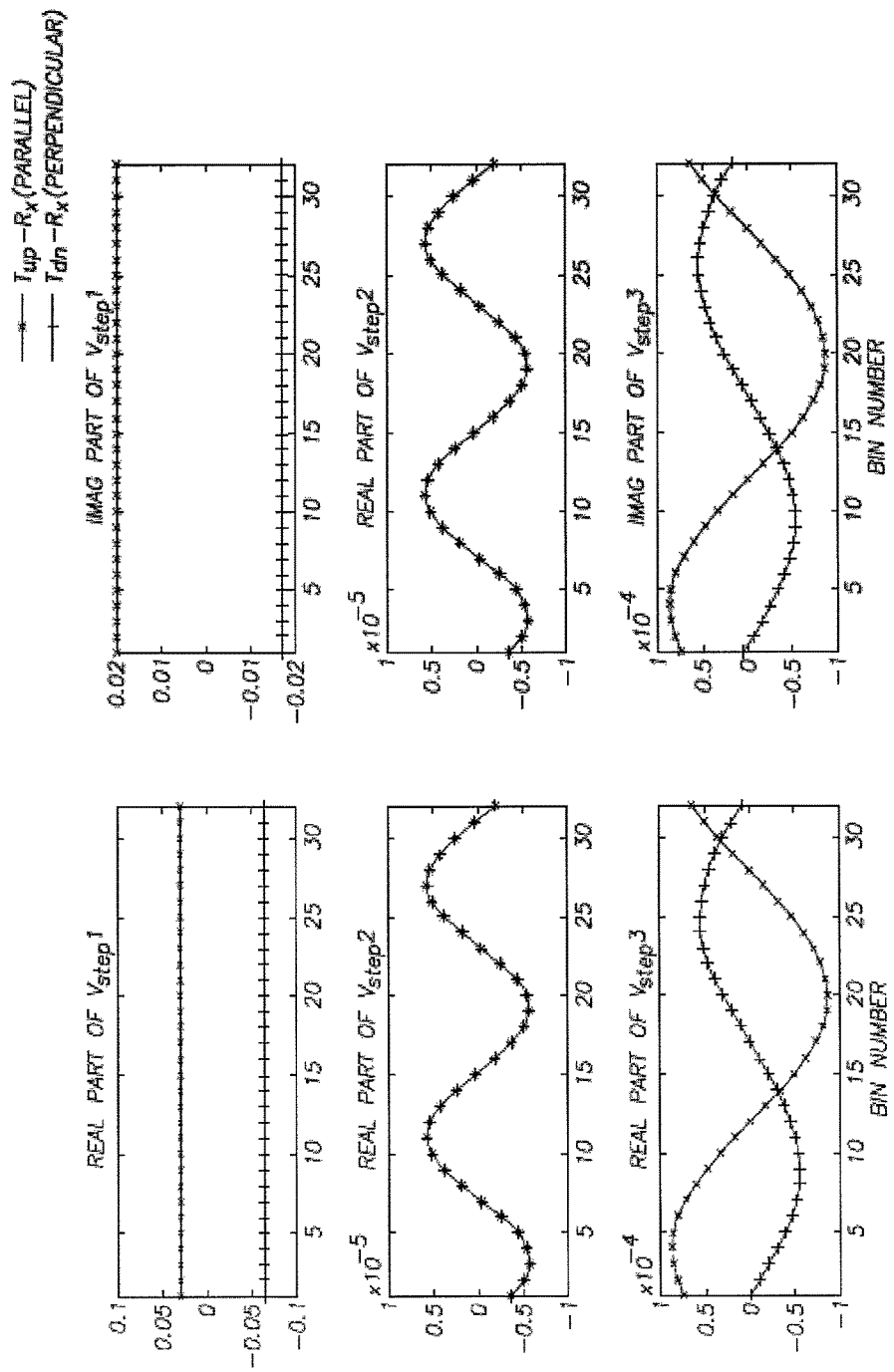
FIG. 15 shows illustrative signal responses with azimuthal angle of 30° to the formation boundary.

FIG. 14 depicts the configuration of a formation model of two layered isotropic media with a boundary between the two layers 1402 and 1404. In this example, the upper layer 1402 has a resistivity of 1 Ω·m and the lower layer 1204 has a resistivity of 4 Ω·m. In the example, the relative dip angle is 15° and the reference point of ADR-TT tool is about 3.58 ft. away from the boundary as shown in FIG. 14. FIG. 15 depicts the modeling signals of Eq. (14a) and Eq. (14b) for this formation model with a relative azimuthal rotation angle $\phi_r$ of 30°. The total 32 bin signals were calculated with a spacing of 52 inch (denoted as d in FIG. 13) and operating frequency of 125 kHz.

Figure 16:
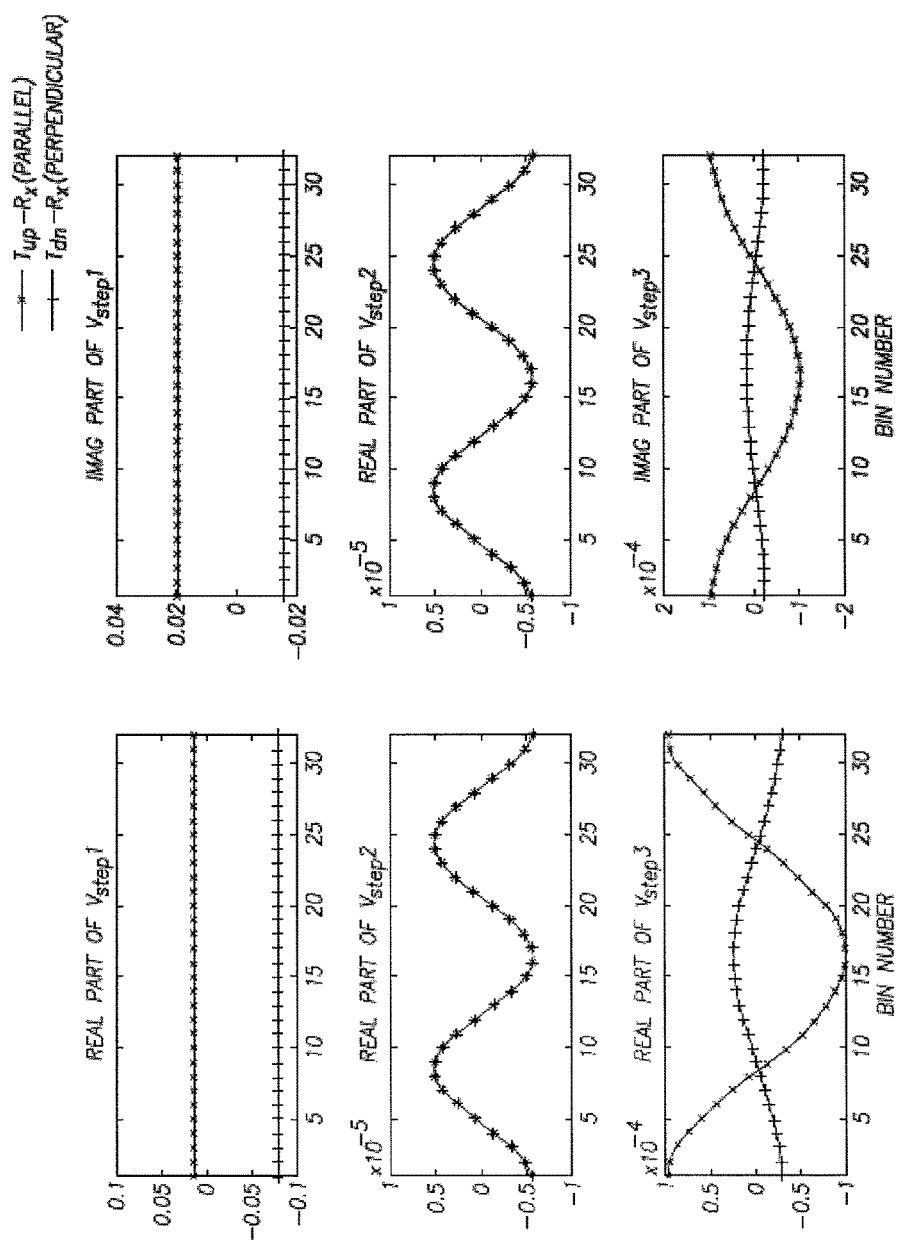
FIG. 16 shows illustrative signal responses with x-axis of tool coordinate system pointing to the formation boundary.
Figure 17:
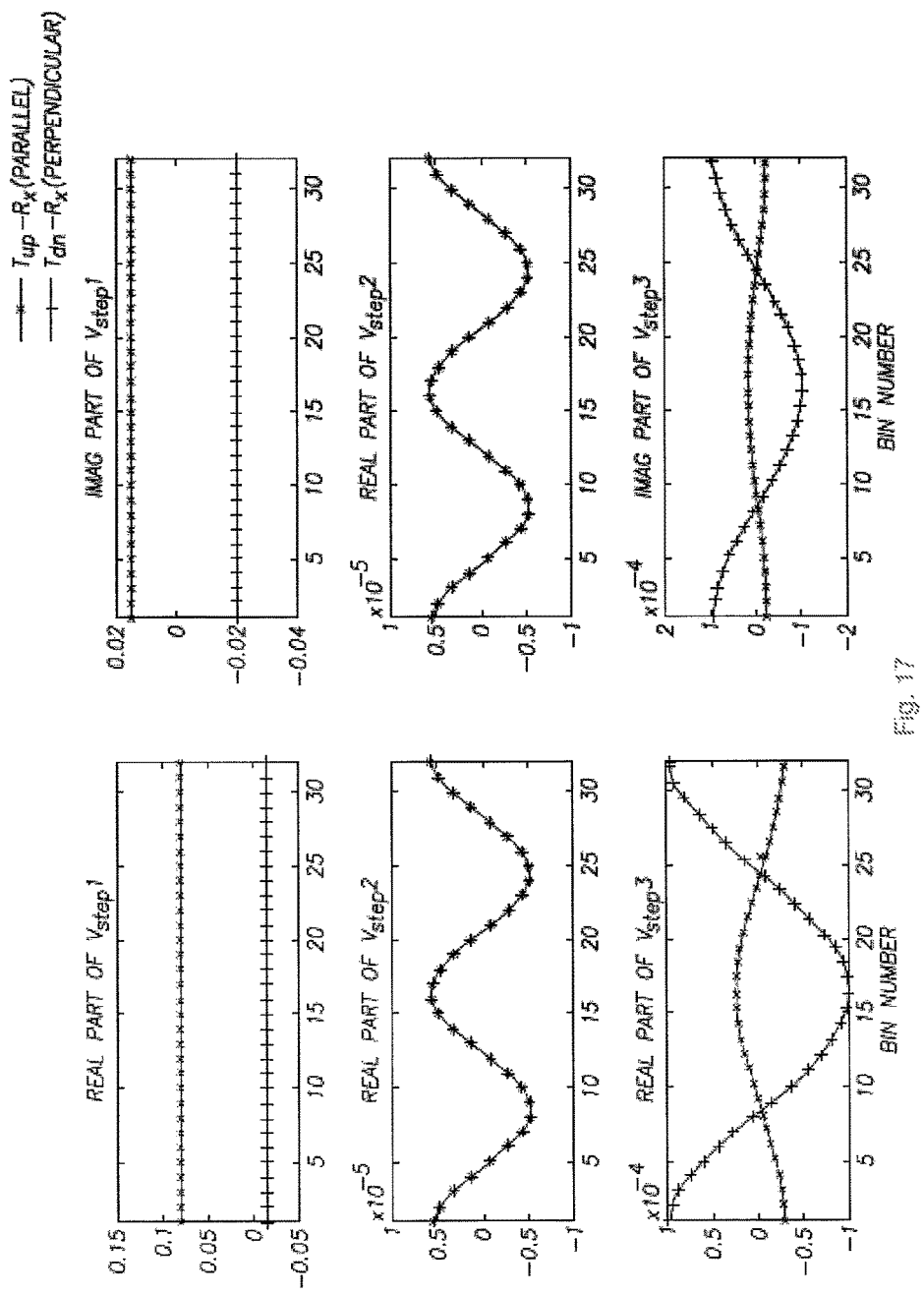
FIG. 17 shows illustrative signal responses with x-axis of tool coordinate system parallel to the formation boundary.

FIG. 16 signal response with x-axis of the tool Cartesian coordinate system 904 pointing to the formation boundary. Specifically, FIG. 16 represents the signals of Eq. (14a) and Eq. (14b) if rotating wrong angle of −60°. As would be appreciated by those of ordinary skill in the art, with the benefit of this disclosure, the amplitude of single cosine wave responses from parallel transmitter-receiver pair ($T_{up}$ and Rx) should be bigger than the amplitude of the single cosine wave responses from the perpendicular transmitter-receiver pair ($T_{dn}$ and Rx). As would be appreciated by those of ordinary skill in the art, with the benefit of this disclosure, this relationship may also be confirmed using Eq. (16a) and Eq. (16b). As discussed above, in conjunction with FIG. 12, a comparison of the amplitudes of V4 and V5 of Eq. (10) may be used to evaluate which of the two relative azimuthal rotation angles ($\phi_r$) from the procedure of the second step reflects the true value of the relative azimuthal rotation angle $\phi_r$. Accordingly, while rotating the tool 902 30° to the boundary target, the amplitude of the single cosine wave of parallel pair increases, whereas that of the perpendicular pair decreases, which verifies that the angle of 30° is the relative azimuthal angle. FIG. 17 shows signal responses for an exemplary embodiment where the x-axis of the tool coordinate system is parallel to the formation boundary.

EXAMPLE II

Figure 18:
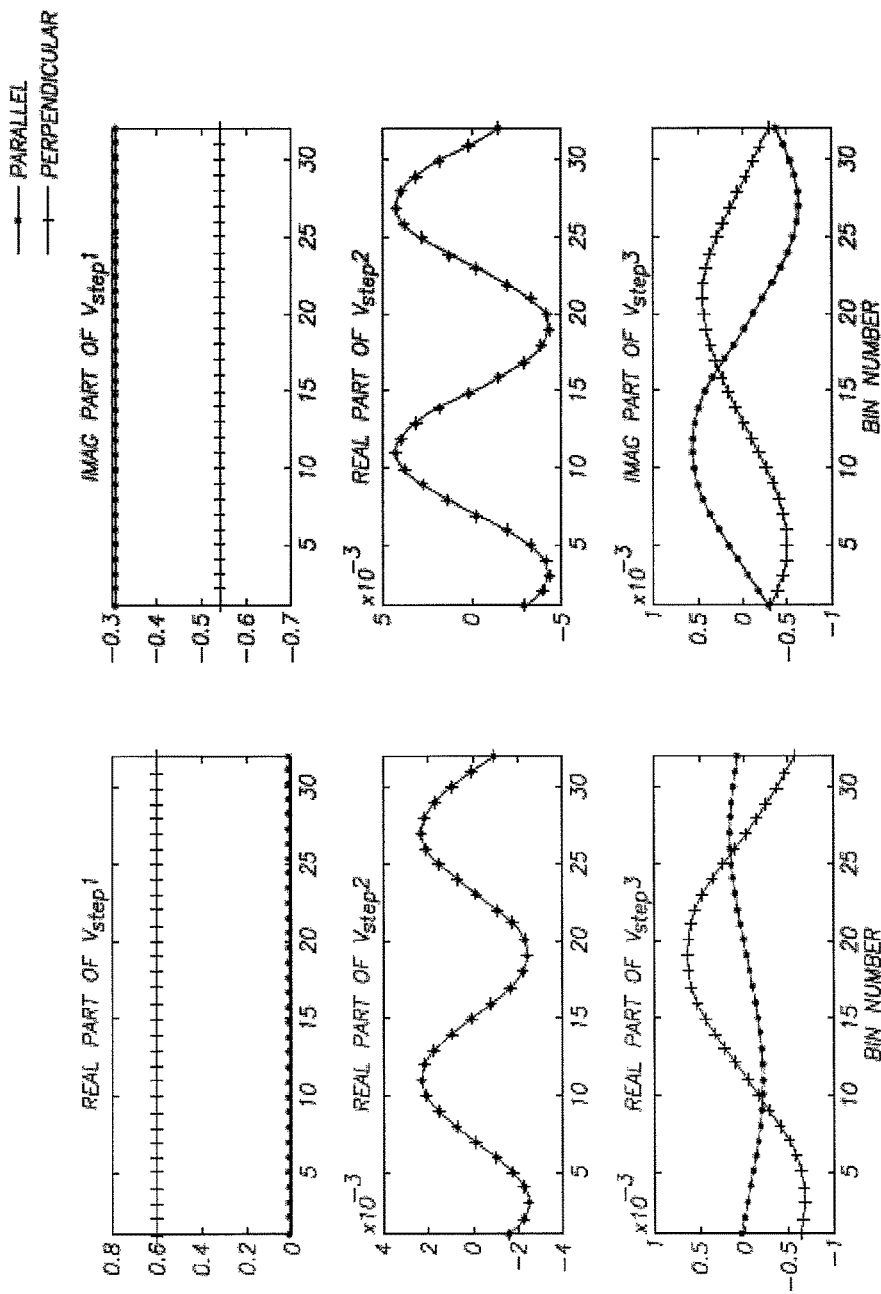
FIG. 18 shows illustrative raw measurements of ADR-TT in a water tank with a surrounding casing target.
Figure 19:
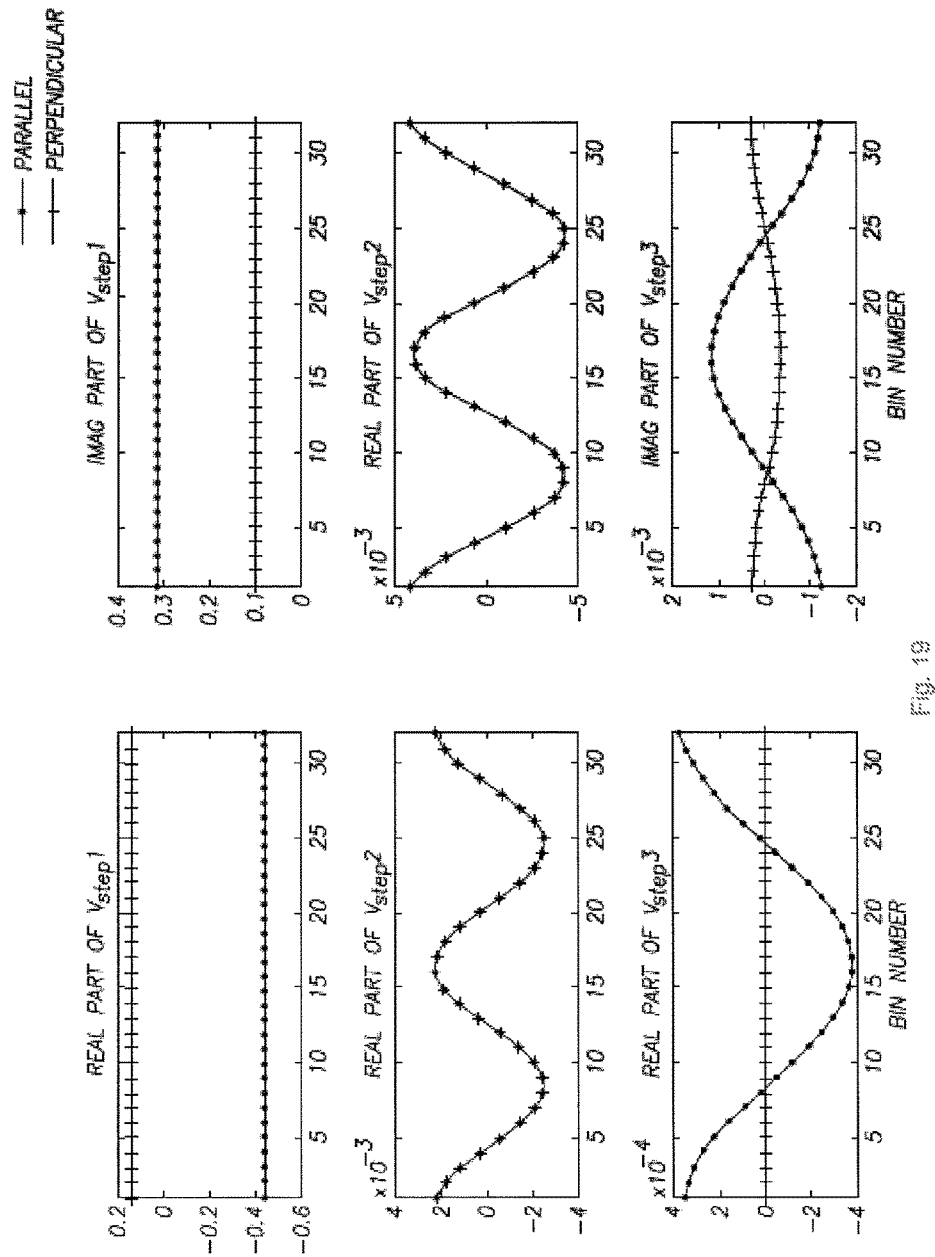
FIG. 19 shows illustrative processed signals of ADR-TT in a water tank to steer the surrounding casing.

A commercially available ADR-TT tool was examined in a water tank with a surrounding conductive casing target to validate the methods disclosed herein. In order to verify the methods disclosed herein, experiments were conducted in a water tank with a surrounding conductive casing parallel to the tool ADR-TT. In order to steer the casing position, the flowchart in FIG. 12 and the processing schemes described herein were applied to the raw measurements from the water tank experiments. FIG. 18 represents raw measurements of a spacing of 44 inches between transmitter and receiver in FIG. 13 with operating frequency of 500 kHz. FIG. 19 shows the processed signals after rotating the tool high side to the target casing. Because there is only one target surrounding the tool, it can be proven using Eq. (16a) and Eq. (16b.) that the single cosine wave responses of perpendicular Tx-Rx pair should be smaller than the responses of parallel Tx-Rx pair. Accordingly, the ADR-TT may be steered to the target casing by using the proposed concept and processing schemes disclosed herein. The results of the experiment confirm that the methods disclosed herein may be used to determine surrounding casing position. Moreover, the experiments confirm that the responses after the processing scheme are similar to the modeling responses.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of processing raw measurements from an electromagnetic resistivity logging tool comprising:
   providing an electromagnetic resistivity logging tool;
      wherein the electromagnetic resistivity logging tool comprises a rotational position sensor; at least one transmitter antenna; and at least one receiver antenna;
   obtaining raw measurements at the at least one receiver antenna;
   averaging all bin measurements at the at least one receiver antenna in a first step based on the raw measurements associated with each bin i with an azimuthal angle $\beta_i$ to obtain a first result, wherein i ranges from 1 to a total number of bins N;
   subtracting the first result from an average of two raw complex voltage measurements at the at least one receiver antenna in a second step to obtain a second result;

wherein the two raw complex voltage measurements comprise a first raw complex voltage measurement based on the raw measurements associated with a bin i with an azimuthal angle $\beta_i$ and a second raw complex voltage measurement based on the raw measurements associated with a bin j with an azimuthal angle $\beta_j$, wherein $\beta_i$ is located opposite $\beta_j$; and averaging a difference between the first raw complex measurement and the second raw complex measurement in a third step to obtain a third result;

using the first result, the second result and the third result to match the raw measurements to forwarding model responses.

2. The method of claim 1, further comprising distributing the raw measurements at the at least one receiver antenna into a group consisting of one or more of a constant complex voltage; an azimuthal voltage as a sinusoid wave response with double periods; and an azimuthal voltage as a sinusoid wave response with a single period.

3. The method of claim 2, further comprising curve fitting the raw measurements obtained at the at least one receiver antenna.

4. The method of claim 3, wherein curve fitting the raw measurements obtained at the at least one receiver antenna comprises using cosine curve fitting.

5. The method of claim 1, wherein a first transmitter antenna of the at least one transmitter antenna is oriented in a first quadrant and a first receiver antenna of the at least one receiver antenna is oriented in a quadrant diagonal to the first quadrant.

6. The method of claim 1, wherein matching the raw measurements to forwarding model responses comprises determining a relative azimuthal rotation angle of the electromagnetic resistivity logging tool.

7. The method of claim 1, further comprising determining a casing position based, at least in part, on the first raw complex voltage.

8. The method of claim 1, wherein the electromagnetic resistivity logging tool further comprises a rotational position sensor.

9. The method of claim 1, further comprising storing the first raw complex voltage.

10. The method of claim 1, further comprising storing the raw measurements.

11. The method of claim 1, further comprising:

determining a coupling matrix based, at least in part, on the first raw complex voltage; and adjusting a drilling direction based, at least in part, on the coupling matrix.

* * * * *